United States Patent
Rizzo (10) Patent No.: US 7,721,564 B2
(45) Date of Patent: May 25, 2010

(54) WILD FREQUENCY AVIONIC REFRIGERATION SYSTEM AND CONTROLLER THEREFOR

(75) Inventor: Richard Rizzo, Burbank, CA (US)

(73) Assignee: B/E Aerospace, Inc., Wellington, FL (US)

( * ) Notice: Subject to any disclaimer, the term of this patent is extended or adjusted under 35 U.S.C. 154(b) by 835 days.

(21) Appl. No.: 11/603,593

(22) Filed: Nov. 21, 2006

(65) Prior Publication Data

US 2008/0115512 A1    May 22, 2008

(51) Int. Cl.
*F25B 1/00* (2006.01)
*F25B 49/00* (2006.01)
*H02M 1/12* (2006.01)

(52) U.S. Cl. .................. 62/228.1; 62/DIG. 5; 363/39

(58) Field of Classification Search ............ 62/134, 62/180, 228.1, DIG. 5; 363/39; 318/400.42, 318/767, 803
See application file for complete search history.

(56) References Cited

U.S. PATENT DOCUMENTS

| | | | |
|---|---|---|---|
| 3,815,378 A | 6/1974 | Hoenisch | |
| 4,327,557 A | 5/1982 | Clarke et al. | |
| 4,663,941 A | 5/1987 | Janke | |
| 4,776,182 A | 10/1988 | Gidseg | |
| 5,003,786 A | 4/1991 | Fudono et al. | |
| 5,227,704 A | 7/1993 | Erdman | |
| 5,303,561 A | 4/1994 | Bahel et al. | |
| 5,606,232 A * | 2/1997 | Harlan et al. | ............ 318/400.3 |
| 5,612,615 A | 3/1997 | Gold et al. | |
| 5,657,638 A | 8/1997 | Erdman et al. | |
| 6,124,646 A * | 9/2000 | Artinian et al. | ............... 290/52 |
| 6,316,895 B1 | 11/2001 | Ramarathnam | |
| 6,534,938 B1 | 3/2003 | Wu et al. | |
| 6,661,190 B1 | 12/2003 | Atmur | |
| 6,691,524 B2 | 2/2004 | Brooke | |
| 6,850,426 B2 * | 2/2005 | Kojori et al. | ................. 363/123 |
| 7,024,874 B2 * | 4/2006 | Zywiak et al. | ................. 62/199 |

FOREIGN PATENT DOCUMENTS

JP      10-197109 A     7/1998

* cited by examiner

*Primary Examiner*—Marc E Norman
(74) *Attorney, Agent, or Firm*—Drinker Biddle & Reath LLP (57) ABSTRACT

A wild frequency avionic refrigeration system and a controller therefore are provided. One embodiment of the refrigeration system includes: a refrigeration LRU including a vapor cycle system with a brushless DC compressor motor, a brushless DC condenser motor, a brushless DC evaporator motor and a plurality of sensors configured to output operating parameter data relative to the vapor cycle system; a power module configured to convert a wild frequency AC input voltage to at least one DC output voltage; a motor control module in communication with the brushless DC compressor, condenser and evaporator motors; and a processing module in communication with the plurality of sensors and the motor control module, wherein the processing module, according to the operating parameter data, outputs control signals to the motor control module for independently driving the brushless DC compressor, condenser and evaporator motors.

18 Claims, 8 Drawing Sheets

WILD FREQUENCY AVIONIC REFRIGERATION SYSTEM AND CONTROLLER THEREFOR

FIELD OF THE INVENTION

This invention pertains generally to refrigeration systems and more particularly to a wild frequency avionic refrigeration system.

BACKGROUND OF THE INVENTION

Conventional avionic refrigeration systems typically include a refrigeration line replaceable unit (LRU), for example, a chiller that is configured to keep items such as food and beverages cold. Such conventional avionic refrigeration systems have a number of drawbacks, largely stemming from the construction of the refrigeration LRU. As is known, conventional refrigeration LRUs include AC induction motors for operating the compressor, condenser and evaporator units. While AC induction motors are used for many applications due to their low cost and ruggedness, AC induction motors are not well suited to avionic applications due to their large size, weight and difficulty to accurately and variably control.

For example, feedback control of AC induction motors is typically accomplished using electromechanical position sensors such as Hall Effect sensors that are disposed in the motor housing. A number of wires extend from the sensor and motor housing to provide signals to a motor controller or the like. Disadvantageously, in an avionic environment, sensor wiring may be aggregated with other power, control and communication wiring in a wiring harness causing position sensor data that is communicated by the wires to be corrupted due to harness crosstalk, electromagnetic interference (EMI) or the like. Furthermore, electromechanical position sensors such as Hall Effect sensors are prone to malfunction or failure over time due to wear and tear. When such a sensor malfunctions or fails, the motor cannot be controlled and must be replaced or repaired. Moreover, in the context of a refrigeration unit, it is difficult to reliably employ a Hall Effect sensor in a compressor due to the compressor being sealed and containing refrigerant and oil. In view of the foregoing, a refrigeration system that included a refrigeration LRU which did not employ AC induction motors and which could be more accurately and variably controlled would be an important improvement in the art.

BRIEF SUMMARY OF THE INVENTION

In one aspect, an avionic refrigeration system is provided. The refrigeration system is powered by a wild frequency AC power supply, the frequency of which varies according to the speed (i.e., RPM) of the aircraft's engines, and the system includes: a refrigeration LRU configured to store food and beverages, the refrigeration LRU comprising a vapor cycle system including a brushless DC compressor motor, a brushless DC condenser motor, a brushless DC evaporator motor and a plurality of sensors configured to output operating parameter data relative to the vapor cycle system; a power module configured to convert a wild frequency AC input voltage to at least one DC output voltage; a motor control module in communication with the brushless DC compressor motor, the brushless DC condenser motor and the brushless DC evaporator motor; and a processing module in communication with the plurality of sensors and the motor control module, wherein the processing module, according to the operating parameter data, outputs control signals to the motor control module for independently driving the brushless DC compressor motor, the brushless DC condenser motor and the brushless DC evaporator motor. In some embodiments of the refrigeration system, a refrigeration unit controller includes the power module, the motor control module and the processing module.

In another aspect, a controller is provided for a refrigeration LRU configured to store food and beverages, wherein the refrigeration unit LRU includes a vapor cycle system having a brushless DC compressor motor, a brushless DC condenser motor, a brushless DC evaporator motor and a plurality of sensors configured to output operating parameter data relative to the vapor cycle system. The controller includes: a power module configured to convert a wild frequency AC input voltage to at least one DC output voltage; a motor control module in communication with the brushless DC compressor motor, the brushless DC condenser motor and the brushless DC evaporator motor; and a processing module in communication with the plurality of sensors and the motor control module, wherein the processing module, according to the operating parameter data, outputs control signals to the motor control module for independently driving the brushless DC compressor motor, the brushless DC condenser motor and the brushless DC evaporator motor.

DETAILED DESCRIPTION OF THE EMBODIMENTS

Figure 1:
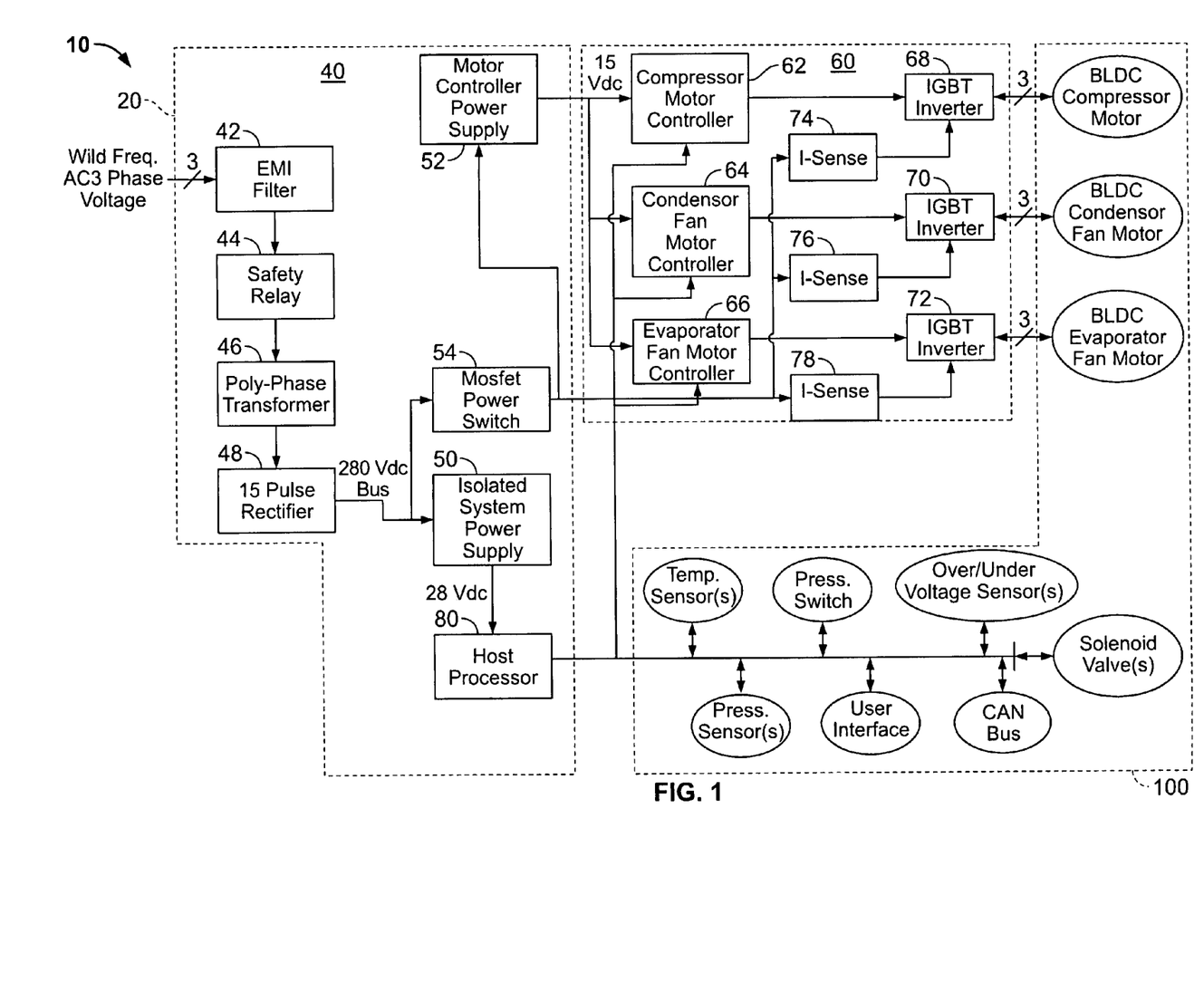
FIG. 1 is a block diagram of an embodiment of a wild frequency avionic refrigeration system.

Referring now to the Figures, a wild frequency avionic refrigeration system and a controller therefor are provided. As shown in FIG. 1, an example wild frequency avionic refrigeration system 10 includes a controller 20 and a refrigeration line replaceable unit (LRU) 100 that is operated in closed-loop feedback control fashion by the controller 20. The controller 20 and refrigeration LRU 100 may communicate with each other via a wired (e.g., Ethernet cable, coaxial cable, twisted pair, etc.) or wireless (e.g., RF) connection. The controller 20, as shown, includes a power module 40, a motor control module 60 and a processing unit 80. Although the controller 20 is illustrated to be separate from the refrigeration LRU 100, the controller 20 and refrigeration LRU 100 may alternatively be integral or otherwise unitary. Additionally, although the example controller 20 is illustrated as including the power module 40, the motor control module 60 and the processing unit 80, one or more portions of the illustrated controller 20 may be integral or otherwise unitary with the refrigeration LRU 100. For example, one embodiment of the refrigeration LRU 100 may include the processing unit 80.

The refrigeration LRU 100 is configured to store and cool comestible items, for example in an aircraft galley, in support of in-flight food and beverage service. Although the refrigeration LRU 100 will be described in greater detail hereinafter with reference to FIGS. 2 and 3, as can be appreciated from FIG. 1, the refrigeration LRU 100 includes a vapor cycle system driven by a plurality of brushless DC (BLDC) motors and a plurality of sensors in communication with the vapor cycle system. The plurality of sensors provides input signals to the processing unit 80 relative to the refrigeration or operating state of the refrigeration LRU. Relative to the received sensor input signals, the processing unit 80 outputs control signals for actuating switches (e.g., solenoid valves) and driving the BLDC motors.

As shown in FIG. 1, the power module 40 of the controller 20 is configured to receive a wild frequency AC input voltage that is provided by a wild frequency AC source (e.g., generators in communication with the aircraft's variable speed engines) and convert that wild frequency AC input voltage to one or more DC voltages. The illustrate example power module 40 includes an electromagnetic interference (EMI) filter 42, a safety relay 44, a polyphase transformer 46, a pulse rectifier 48, a first DC power supply 50, a second DC power supply 52 and a power switch 54. As can be appreciated, the safety relay 44 and the power switch 54 provide a power protection module that protects the controller 20 from being damaged by AC power anomalies such as over-voltage transients, voltage interruption and the like. The power protection module will be described in greater detail hereinafter with reference to FIG. 5. As shown, the polyphase transformer 46 and pulse rectifier 48 cooperate to provide a power conversion module that converts the wild frequency AC input voltage, which may vary from about 360 Hz to about 800 Hz and have a line-to-line (LL) voltage of about 208 Volt AC, to at least one DC voltage including a 280 Volt DC bus voltage. The first power supply 50 is configured to transform the 280 Volt DC bus voltage to a 28 Volt DC isolated output that energizes the processing unit 80. Similarly, the second power supply 52 is configured to transform the 280 Volt DC bus voltage to a 15 Volt DC that energizes the motor control module 60. Power switch 54 is interposed between the power conversion module and the second power supply 52 to provide bus voltage interrupt protection. As can be appreciated, because the motor control module employs a control algorithm relative to back EMF (BEMF) of the BLDC motors, closed loop feedback operation of the BLDC motors cannot be maintained when the 280 Volt DC bus is disturbed because motor BEMF (indicative of rotor position and/or speed) may be misinterpreted resulting in the control module driving the BLDC motors with invalid phase voltages and currents, which could damage the motors. To this end, the 280 Volt DC bus is deenergized by power switch 54, which may be, for example, a high voltage metal oxide field effect transistor (MOSFET) that is operative to switch off at about 1 millisecond (ms).

As further shown in FIG. 1, the motor control module 60 includes first, second and third motor commutation modules 62, 64 and 66. The motor commutation modules 62, 64, 66 are energized by the second power supply 52 and are independently controlled by the processing unit 80. The motor control module 60 includes first, second and third three phase inverters 68, 70, 72 that provide an inverter module that is configured to independently drive three BLDC motors. Furthermore, the control module 60 includes first, second and third motor BEMF current-sensors 74, 76, 78 that provide a current-sensing module thereby enabling feedback-control of the BLDC motors. As shown, a first inverter 68 in communication with the first commutation module 62 for driving a first BLDC motor (e.g., the compressor motor as shown) relative to a first BEMF current-sensing module 74. Furthermore, the motor control module 60 includes a second inverter 70 in communication with the second commutation module 64 for driving a second BLDC motor (e.g., the condenser fan motor as shown) relative to a second BEMF current-sensing module 76. Moreover, the motor control module 60 includes a third inverter 72 in communication with the third commutation module 66 for driving a third BLDC motor (e.g., the evaporator fan motor as shown) relative to a third BEMF current-sensing module 78.

Figure 2:
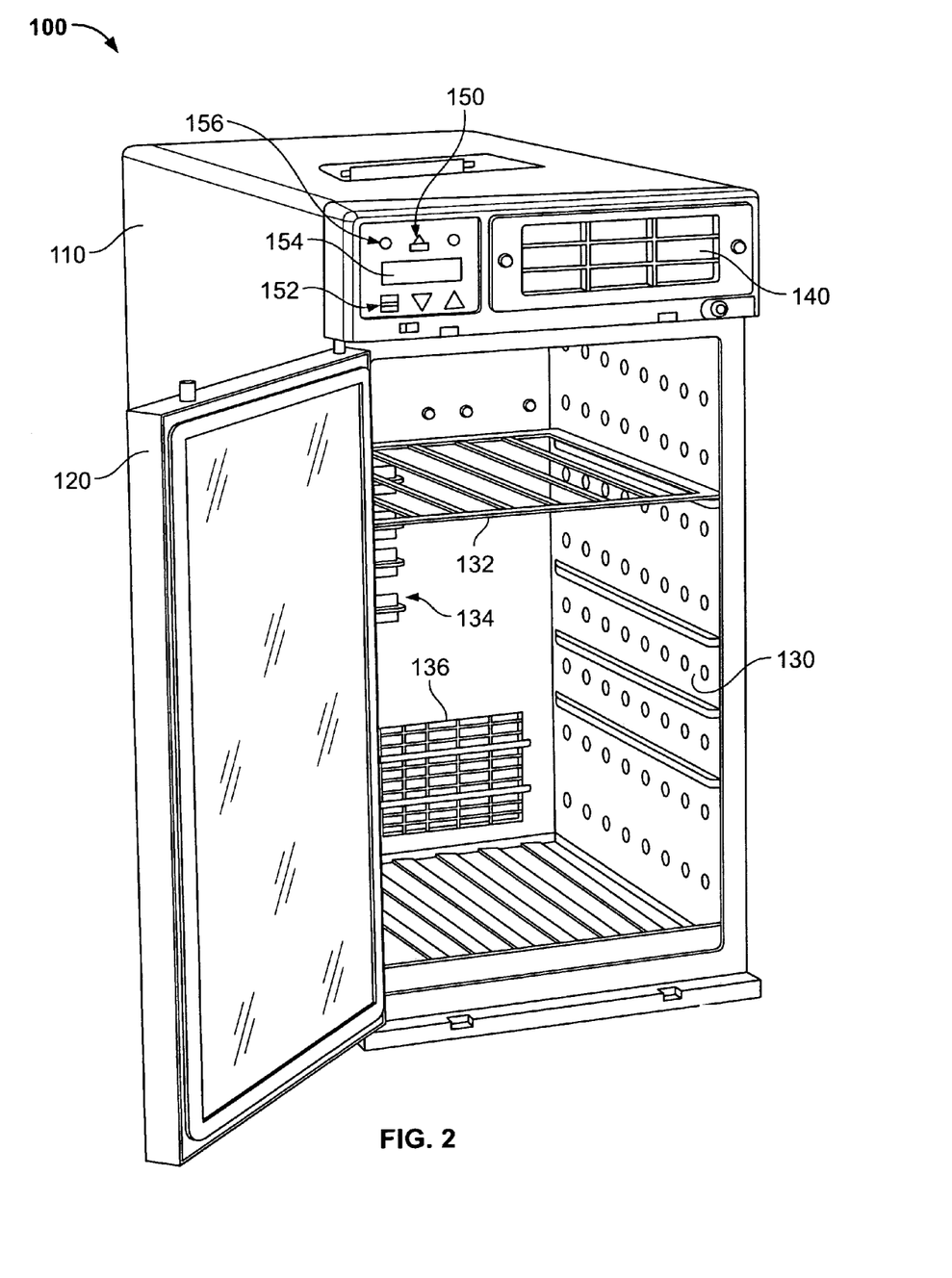
FIG. 2 is a front perspective view of an example embodiment of a refrigeration LRU of the refrigeration system of FIG. 1.

Referring now to FIG. 2, an example refrigeration LRU 100 is provided. As shown, the refrigeration LRU 100 includes a housing 110, a door 120 that is coupled with the housing 110 for movement between a closed orientation and an open orientation, an insulated cavity 130 within the housing 110 for storing items (e.g., food and beverages) to be refrigerated, an air intake 140 and a user interface 150. The refrigeration LRU 100 is a self-contained, stand-alone refrigeration unit that chills air for the purpose of maintaining food and beverage items at proper storage temperatures within the insulated cavity 130. As shown, the housing 110 has a generally compact, rectangular polyhedron shape to facilitate installation of the refrigeration LRU 100 in a galley of an aircraft, but the housing 110 may be configured in other shapes for installation in other vehicles and locations, for example, busses, trains, vans, residences and offices. The door 120 is coupled with the housing 110 for example by a hinge to pivotally move between an open orientation (shown in FIG. 1) wherein the insulated cavity 130 is exposed for accessing items therein and a closed orientation wherein the insulated cavity 130 is sealed. The refrigeration LRU 100 may include a knob, handle or the like (not illustrated) that is configured on the door 120 or on the housing 110 for closing/latching/locking and opening/unlatching/unlocking the door 120. For example, aircraft personnel may operate the knob, handle or the like to secure the door 120 in the closed orientation for safety during aircraft takeoff and landing and instances of turbulence.

The insulated cavity 130 is configured to store passenger food and beverages. For example, the insulated cavity 130 may have a volume of about 1.0 cubic feet such that the insulated cavity 130 can accommodate twelve standard wine bottles—nine standing upright on the floor of the insulated cavity and three lying on a shelf 132 shown in FIG. 1. The shelf 132 may be used for supporting and organizing items in the insulated cavity 130, but is not required. As shown, the shelf 132 is configured as an open array of wires or bars so as not to obstruct airflow in the insulated cavity 130. However, the shelf 132 may be configured otherwise, for example as a solid planar member. The shelf 132 may be removable and reconfigurable in the insulated cavity 130. That is, the shelf 132 may be removed and reinstalled in the insulated cavity 130 at a different height above the floor of the insulated cavity 130. Although one shelf 132 is illustrated, fewer or additional shelves may be provided as desired. As shown, grills or registers 134 and 136 are configured on a back wall of the insulated cavity 130. Herein, grill 134 supplies refrigerated air to the insulated cavity 130 while grill 136 provides a return for air that has flowed through the insulated cavity 130 and cooled the items therein. However, of course, the grills 134, 136 could be configured oppositely so that grill 136 supplies refrigerated air and grill 134 provides a return. Ambient temperature air is received by the air intake 140 that is configured on a front of the housing 110. The ambient temperature air from the air intake 140 flows into the refrigeration system, which will be discussed hereinafter in detail, to be cooled and then circulates in the insulated cavity 130 via grills 134 and 136.

As further shown in FIG. 1, the refrigeration LRU 100 includes a user interface 150. The user interface 150 is illustrated as being configured on the front of the housing 110 proximate the air inlet 140, but the user interface 150 may be configured otherwise. As shown, the user interface 150 includes one or more user-manipulable actuators 152, a display 154 and one or more indicators 156. The actuators 152 may be various devices known in the art such as, buttons (e.g., snap-domes), switches (e.g., microswitches), dials, etc. for outputting a signal to, for example, a controller for controlling/varying operation of the refrigeration LRU 100 and requesting information. The display 154 may be various devices known in the art such as, an LCD panel, an LED array, etc. for displaying alphanumeric or other indicia relative to operation of the refrigeration LRU 100. The one or more indicators 156 may provide one or more visual and/or audible warnings or alerts that the refrigeration LRU 100 is not operating properly. For example, the indicators 156 may be embodied as one or more lights such as LEDs and/or a speaker, buzzer or the like for outputting a sound. In one embodiment, the one or more indicators 156 include a green light to indicate normal operation, a red light to indicate that the refrigeration unit has a failure or fault, and an amber light to indicate that the temperature within the internal cavity differs from the user-selected operating state and temperature set-point. Via the user interface 150, a user may select a mode of operation (e.g., chiller, refrigerator, freezer refrigeration state) for the refrigeration LRU 100, select or otherwise determine a temperature set-point for the insulated cavity 130, and request information (e.g., number of hours operating, number of defrosts, number of failures, etc.) relative to the current and historical operation of the refrigeration LRU 100 and one or more various components and subsystems therein.

Figure 3:
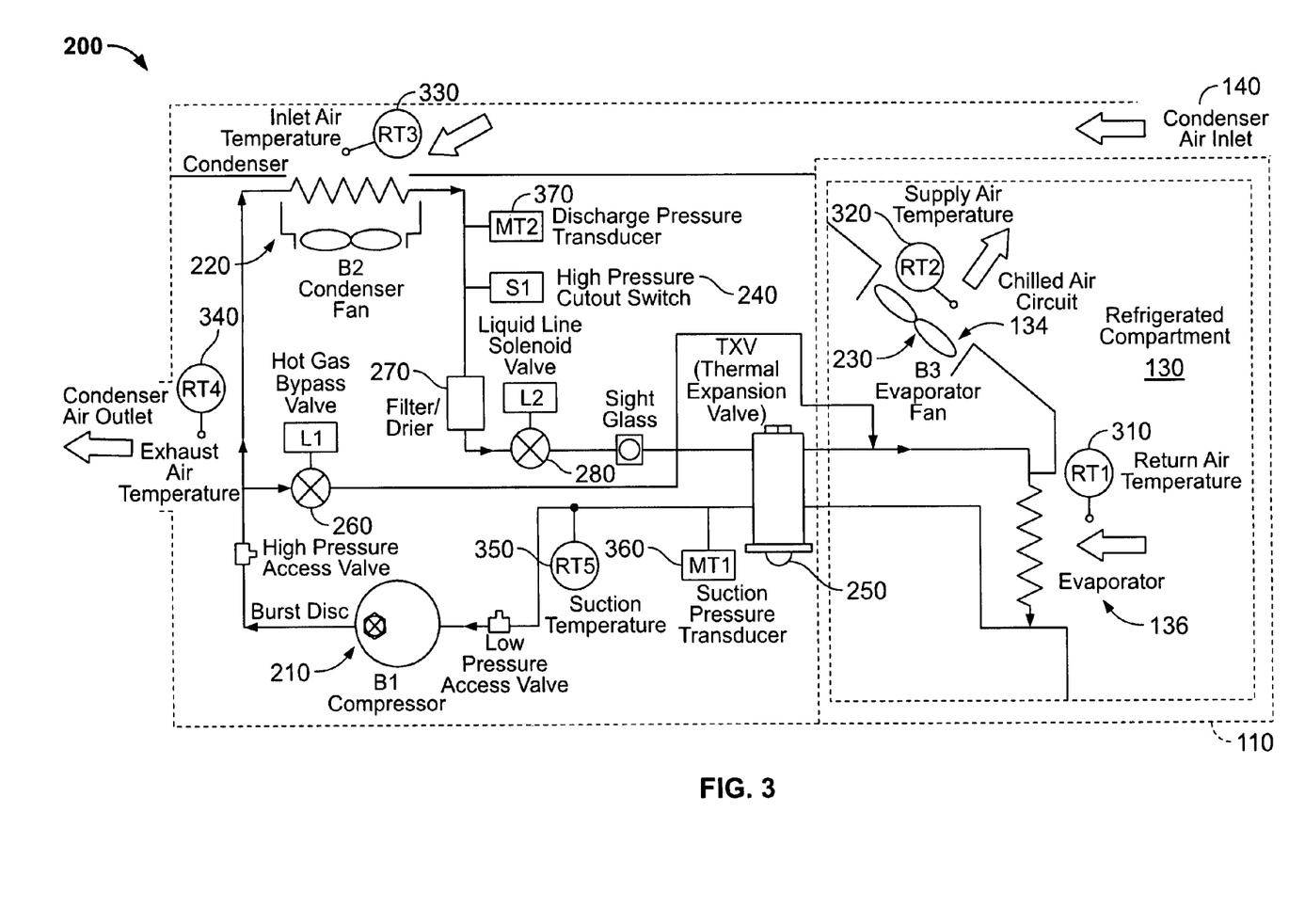
FIG. 3 is a diagrammatic view illustrating the refrigeration LRU of FIG. 2.

Referring now to FIG. 3, the vapor cycle system of the refrigeration LRU 100 of FIG. 2 is described. As shown in FIG. 3, the vapor cycle system 200 is disposed within the housing 110, which is illustrated diagrammatically in dashed lines. Airflow through the vapor cycle system 200 is illustrated by the large arrows. The vapor cycle system 200 includes various refrigeration components and a plurality of sensors in communication with the refrigeration components for monitoring and controlling operation of the vapor cycle system 200. As shown, the refrigeration components of the vapor cycle system 200 include a compressor unit 210, a condenser unit 220, an evaporator unit 230, a high pressure cutout switch 240, a thermal expansion valve 250, a hot gas bypass valve 260, a filter/drier unit 270 and a liquid line solenoid valve 280. Although not illustrated in FIG. 3, the compressor unit 210 includes a BLDC motor (shown in FIG. 1). Furthermore, the condenser unit 220 and the evaporator unit 230 each includes a BLDC motor (shown in FIG. 1) for rotating fan blades to move air over a condenser and an evaporator heat exchanger, respectively. As known in the art, the vapor cycle system 200 provides the transport loop for rejecting heat from the insulated cavity 130 of the LRU 100.

In operation, a refrigerant (e.g., HFC-134a, Freon, etc.) enters the compressor unit 210 as a low temperature, low-pressure vapor where it is compressed to a high pressure and temperature such that it will condense at ambient temperatures. From the compressor unit 210, the refrigerant travels to the condenser unit 220 where heat is rejected (i.e., the ambient air is cooled) and the refrigerant is condensed to a high-pressure liquid. A hot gas bypass valve 260 (e.g., a solenoid-controlled valve) couples a refrigerant outlet of the compressor unit 210 to an inlet of the evaporator unit 230. From the condenser unit 220, the refrigerant in liquid state travels through the filter/drier unit 270 where any moisture and solid contaminants are removed from the refrigerant. Next, the refrigerant travels through a solenoid valve 280, which meters refrigerant flow to a suitable rate and pressure. Refrigerant exiting the solenoid valve 280 enters the expansion valve 250 and is dropped to a saturation temperature corresponding to the user-selected operating state and temperature set-point. The expansion valve 250 may be, for example, a block-type expansion valve with an internal sensing bulb. From the expansion valve 250, the refrigerant enters the evaporator unit 230 as a mixture of liquid and vapor. The liquid in the refrigerant mixture absorbs the heat from the warmer air returning from the insulated cavity 130 via return 136 and becomes completely vaporized as it exits the evaporator heat exchanger. Heat absorbed in the evaporator unit 230 is rejected to ambient cabin air via an exhaust (e.g., configured on a rear side of the housing 110) by the motor-driven fan of the condenser unit 220. The motor-driven fan of the condenser unit 220 also creates a negative pressure on the inlet side of the condenser unit 220 thus drawing in ambient air through the air inlet 140. The airflow created by this fan carries the heat out the exhaust and, for example, into an outlet duct that may be provided in the galley.

As previously mentioned, the refrigeration LRU 100 includes a plurality of sensors configured to monitor operation of the vapor cycle system 200. A first plurality of sensors is provided to monitor the temperature of airflow through the vapor cycle system 200 in various locations of the system 200. Furthermore, a second plurality of sensors is provided to monitor the pressure and temperature of the refrigerant in various locations of the system 200. As shown in FIG. 3, the plurality of sensors includes temperature sensors 310, 320, 330, 340, 350 and pressure sensors 360, 370. One or more of the temperature sensors 310, 320, 330, 340, 350 may be a thermistor, thermocouple or any suitable device known in the art for sensing temperature. Furthermore, one or more of the pressure sensors 360, 370 may be a pressure transducer, pressure switch or any suitable device known in the art for sensing fluid pressure. The return air temperature sensor 310 is configured proximate the return grill 136 (FIG. 2) in the insulated cavity 130. The supply air temperature sensor 320 is configured proximate the supply grill 134 (FIG. 2) in the insulated cavity 130. The inlet air temperature sensor 330 is configured proximate the air inlet 140 (FIG. 2) or an inlet of the condenser unit 220 to detect the temperature of ambient air flowing into the system 200. The exhaust air temperature sensor 340 is configured proximate an exhaust to detect the temperature of air flowing out of the vapor cycle system 200. The suction temperature sensor 350 is configured to detect the temperature of low pressure refrigerant between the thermal expansion valve 250 and the compressor unit 210. The suction pressure sensor 360 is configured proximate the suction temperature sensor 350 to detect the pressure of low pressure refrigerant between the thermal expansion valve 250 and the compressor unit 210. The discharge pressure sensor 370 is configured proximate to detect pressure of refrigerant flowing between an outlet of the condenser unit 220 and the filter drier unit 270. Furthermore, the discharge pressure sensor 370 may be configured proximate a high pressure cutout switch 240. Indeed, the foregoing-described plurality of sensor may be configured otherwise, for example, provided with fewer or additional temperature sensor and/or pressure sensors, or the plurality of sensors may be arranged to sense pressure and/or temperature in other locations within the vapor cycle system 200.

Figure 4:
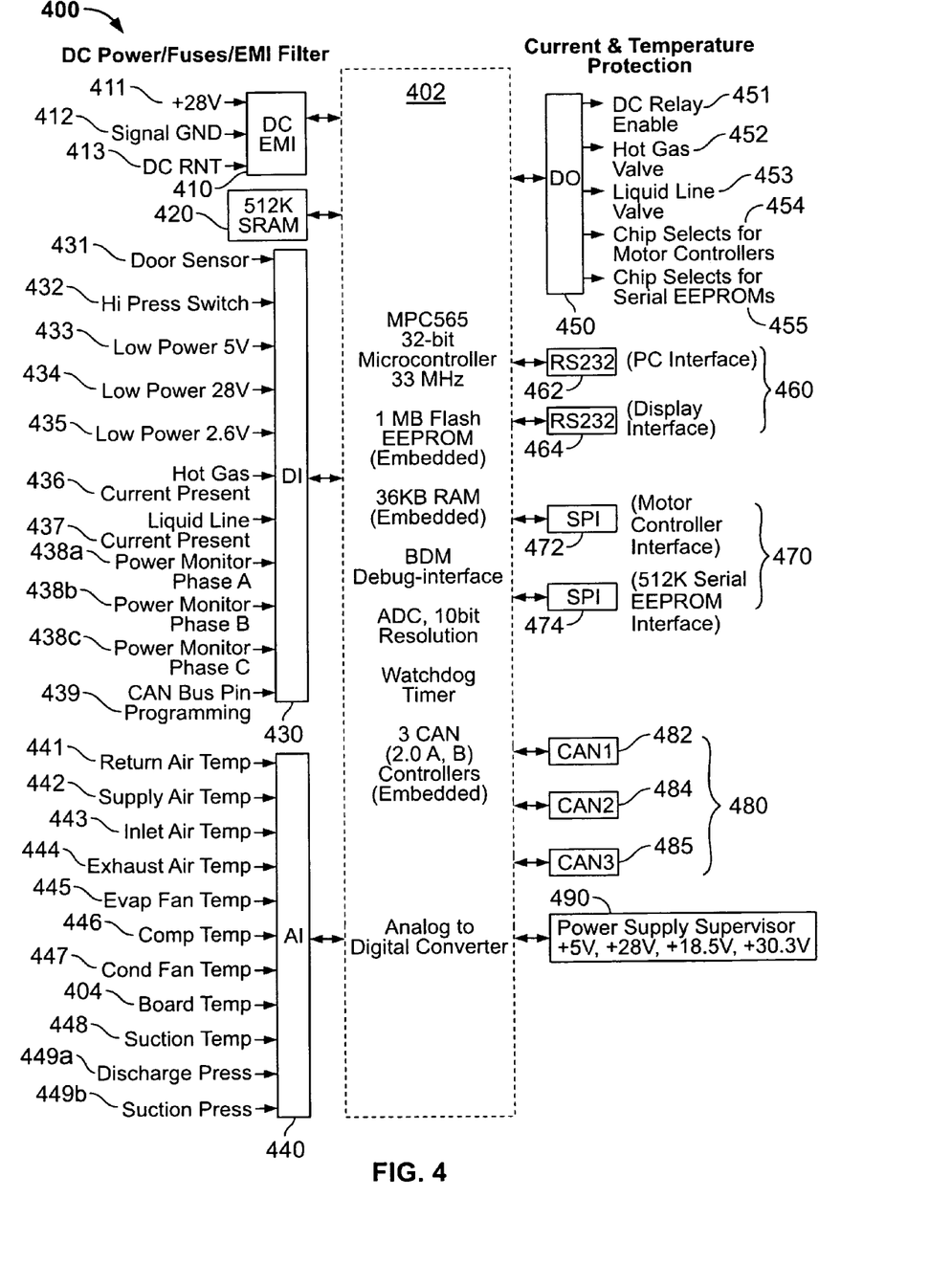
FIG. 4 is a block diagram illustrating an example processing unit for the refrigeration system of FIG. 1.

Turning now to FIG. 4, an example processing unit 80 is provided for controlling operation of the vapor cycle system 200 of refrigeration LRU 100. As shown in FIG. 4, the processing unit 80 may include a processor 402. As can be appreciated, although the processor 402 may be various devices known in the art such as a microprocessor, microcontroller, DSP, PLC, FPGA, state machine or the like, in some embodiments of the processing unit 80 it is advantageous for the processor 402 to be an integrated circuit (IC) microcontroller or microprocessor. Although the processing unit 80 is illustrated in FIG. 4 as including the 32-bit, 33 MHz MPC565 microcontroller that is available from Freescale Semiconductor, Inc., the processor 402 may be other suitable ICs such as, for example the MC68HC908MR32 microcontroller and others. The processor 402 executes algorithms, software or firmware for processing a plurality of inputs (e.g., signals from the plurality of sensors of the system 200, and user inputs from the user interface 150) and effecting a plurality of, for example, control and informational outputs relative to the plurality of inputs. Furthermore, in some embodiments of the controller 20, the processor 402 may determine an occurrence of an event according to the plurality of inputs and dynamically (i.e., at variable or non-fixed intervals or rates) log operational parameter (e.g., sensor) data relative to the event occurrence.

The processing unit 80 includes a plurality of modules that interface or are otherwise in communication with the processor 402. As shown, the plurality of modules includes a power input module 410, a memory module 420, a digital input module 430, an analog input module 440, an output module 450, a first communication module 460, a second communication module 470, a network communication module 480 and a power supply input supervisor module 490. Although the foregoing modules 410-490 are illustrated as being separate from the processor 402, one or more of the modules may alternatively be integral or unitary with the processor 402. The power input module 410 provides DC power, power protection and EMI filtering to the processor 402. 28V DC power input 411, signal ground input 412, and DC return input 413 interface with the power input module 410. The memory module 420 provides data storage for the processor 402. As shown, the memory module 420 is a 512K SRAM, but may be other types and sizes of memory. Additionally, although the memory module 420 is illustrated as being separate from the processor 402, the memory module 420 may alternatively be integral with (i.e., on-board) the processor 402.

The digital input module 430 receives and aggregates a plurality of digital input signals. As shown, the digital input module 430 interfaces with a door sensor input 431 (indicates that the door 120, FIG. 2 is not properly closed), a high pressure switch input 432 (indicates that the high pressure cutout switch 240, FIG. 3 detects a high pressure condition), a low power 5V input 433, a low power 28V input 434, a low power 2.6V input 435, a hot gas current present input 436 (indicates a current being supplied to the solenoid of hot gas bypass valve 260, FIG. 3), a liquid line current present input 437 (indicates a current being supplied to the solenoid of liquid line solenoid valve 280, FIG. 3), power monitor phase A, B and C inputs 438*a*, 438*b*, 438*c* (indicating a loss of phase), respectively, and a bus pin programming input 439. The analog input module 440 receives and aggregates a plurality of analog input signals, providing the analog input signals to an A/D converter of the processor 402. Alternatively, the analog input module 440 may include an A/D converter that interfaces with the processor 402. As shown, the analog input module 440 interfaces with a return air temperature input 441, a supply air temperature input 442, an inlet air temperature input 443, an exhaust air temperature input 444, an evaporator unit fan motor (stator) temperature input 445, a compressor unit motor (stator) temperature input 446, a condenser unit fan motor (stator) temperature input 447, a controller board temperature input 404, a refrigerant suction temperature input 448, a refrigerant discharge pressure input 449*a* and a refrigerant suction pressure input 449*b*. As can be appreciated, the inputs 441-449 generally correspond with the temperature and pressure sensors 310-370 (FIG. 3).

As further shown in FIG. 4, the output module 450 provides a discrete control interface between the processor 402 and remote components, for example, relays, actuators (e.g., solenoid switches), etc. of the system 200 for current and temperature protection. As illustrated, the output module 450 provides digital or discrete output control signals including DC relay enable output 451 (enables VDC bust to motor controllers), hot gas valve open/close output 452 (controls the state of the hot gas bypass valve 260, FIG. 3), liquid line valve open/close 453 (controls the state of the liquid line valve 280, FIG. 3), chip selects for (compressor, condenser, evaporator) motor controllers 454 (selects the motor commutation control module 62, 64, 66 with which to communicate) and chip selects for serial EEPROMs 455 (selects the correct memory module for writing data entries to the history log data structure). The first communication module 460 as shown is an RS232 communication interface providing asynchronous serial communication. Communications between the processor 402 and an external personal computer (PC) is provided by PC interface 462 for the purposes of, for example, programming the controller 20, vapor cycle system 200 diagnostics, debugging of the controller 20, and exercising various modules or subsystems of the vapor cycle system 200 (e.g., the compressor unit 210, the condenser unit 220, the evaporator unit 230, etc.). Furthermore, communications between the processor 402 and a user interface including a display (e.g., the display 154 of the user interface 150, FIG. 2 or a "dumb" terminal) is provided by display interface 464 for the purposes of, for example, displaying data entries of a history log data structure, changing the temperature set-point, activating the one or more indicators 156 (FIG. 2), etc. The second communication module 470 as shown is a serial peripheral interface (SPI) providing communications between the processor 402 (being the master) and various (slave) external devices. Control and feedback communications with the motor control module 60 (FIG. 1), which controls the operation of the compressor unit motor, condenser unit motor, and evaporator unit motor of the vapor cycle system 200, is provided by motor controller interface 472 for controlling motor speed and/or direction. Furthermore, communications between the processor 402 and one or more external memory modules (e.g., three 32K EEPROMs) is provided by interface 474 for writing and retrieving data entries of the history log data structure.

Although the present exemplary refrigeration LRU 100 is a stand-alone unit requiring only a power connection, the controller 20 may also include a network communication module 480 so that the processor 402 may communicate with other vehicle subsystems, LRUs and the like via a communication bus or network. The controller 20 may be integral with the refrigeration LRU 100 (e.g., disposed within the housing 110), however, the controller 20 may alternatively be configured outside the housing 110 distal the refrigeration LRU 100 and in communication therewith via a wired or wireless link. As shown, the network communication module 480 is configured to interface the processor 402 with a bus or network using CAN protocol, but alternatively the network communication module 480 may be configured to interface the processor 402 with a bus or network using LIN, J1850, TCP/IP or other communication protocols known in the art. Power supply supervisor module 490 is in communication with the processor 402 and provides one or more of voltage, current and power monitoring for the controller 20 and/or the refrigeration LRU 100.

Figure 5:
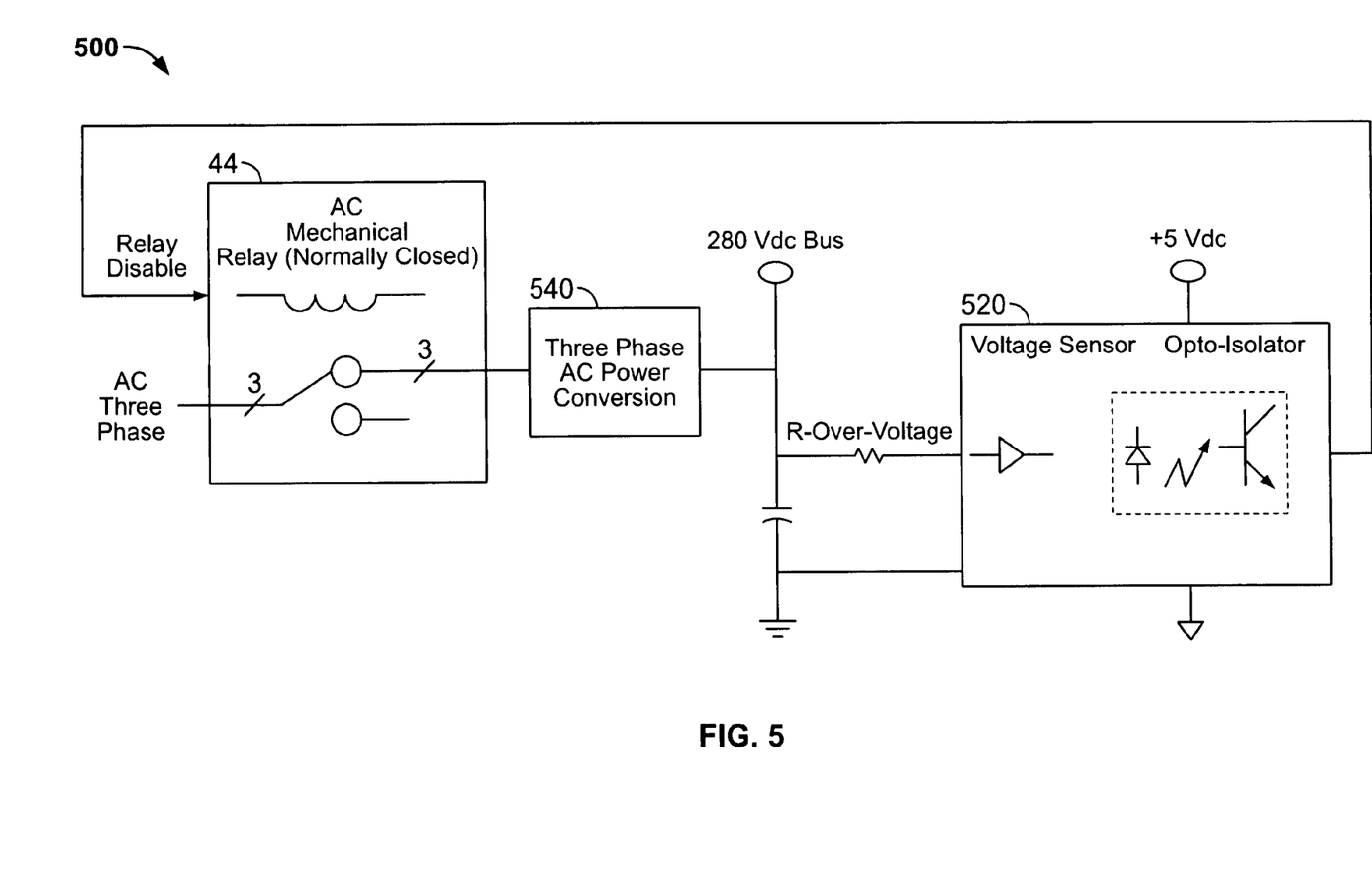
FIG. 5 is a block diagram illustrating an example power protection module for the refrigeration system of FIG. 1.

Referring now to FIG. 5 a power protection module of the power module 40 (FIG. 1) is described. When utilizing AC induction motors in fixed frequency avionic power systems, over voltage transients and voltage interrupts can be tolerated since the reaction of an induction motor to a voltage transient or interrupt is a momentary reduction in rotor RPM. However, if the 280 Volt DC bus, or the processor 402 (FIG. 4) executing a BLDC motor control algorithm motor controller is momentarily interrupted, the BEMF information, which is processed to determine the position and or speed of the rotor, can be corrupted, resulting in loss of motor control and possible damage to the motor. To this end, the power protection module 500 is provided so that the controller 20 and BLDC motors are protected against AC power anomalies (e.g., over-voltage transients and voltage interrupts) and DC over/under-voltage, both of which that could potentially disrupt the 280 Volt DC bus and the switching power supplies that convert the 280 Volt DC to lower voltages. As shown in FIG. 5, the power protection module 500 includes the safety relay 44 and a DC bus voltage sensor 520. The safety relay 44 is configured to receive the wild frequency AC input voltage and is in a normally-closed state for transferring the wild frequency AC input voltage to the power conversion module 540. As shown, the power conversion module 540 converts the wild frequency AC input voltage, which may vary from about 360 Hz to about 800 Hz and have a line-to-line (LL) voltage of about 208 Volt AC, to a 280 Volt DC bus voltage. The power conversion module 540 will be described in more detail hereinafter with reference to FIG. 6.

Over voltage transient protection involves sensing the wild frequency three phase AC power input for high voltage transients. Transients above a predetermined voltage threshold are detected by an over-voltage sensor (e.g., integral with the relay 44) so that the normally closed relay 44 is actuated. When the relay 44 is actuated the wild frequency AC input power is disconnected from the controller 20 so that the system 10 is protected until the over voltage condition terminates. As further shown, an over-voltage resistor (R-Overvoltage) and a capacitor, which is connected between the 280 Volt DC bus and ground, interface the DC bus voltage sensor 520 to the 280 Volt DC bus. The DC bus voltage sensor 520 is configured to detect DC bus over and under voltage and provide a relay disable signal to the relay 44. In some embodiments the DC bus voltage sensor 520 may include an opto-isolator as shown for communicating the relay disable signal to the relay 44. Although not illustrated in FIG. 5, the DC bus voltage sensor 520 may additionally communicate with the power switch 54 (FIG. 1) for deenergizing the 280 Volt DC bus if, for example, the DC bus voltage falls below a predetermined DC bus low voltage threshold. The illustrated power protection module 500 is exemplary and may be configured otherwise for protecting the controller 20 and system 10 from voltage and/or current transients and/or interruptions.

Figure 6:
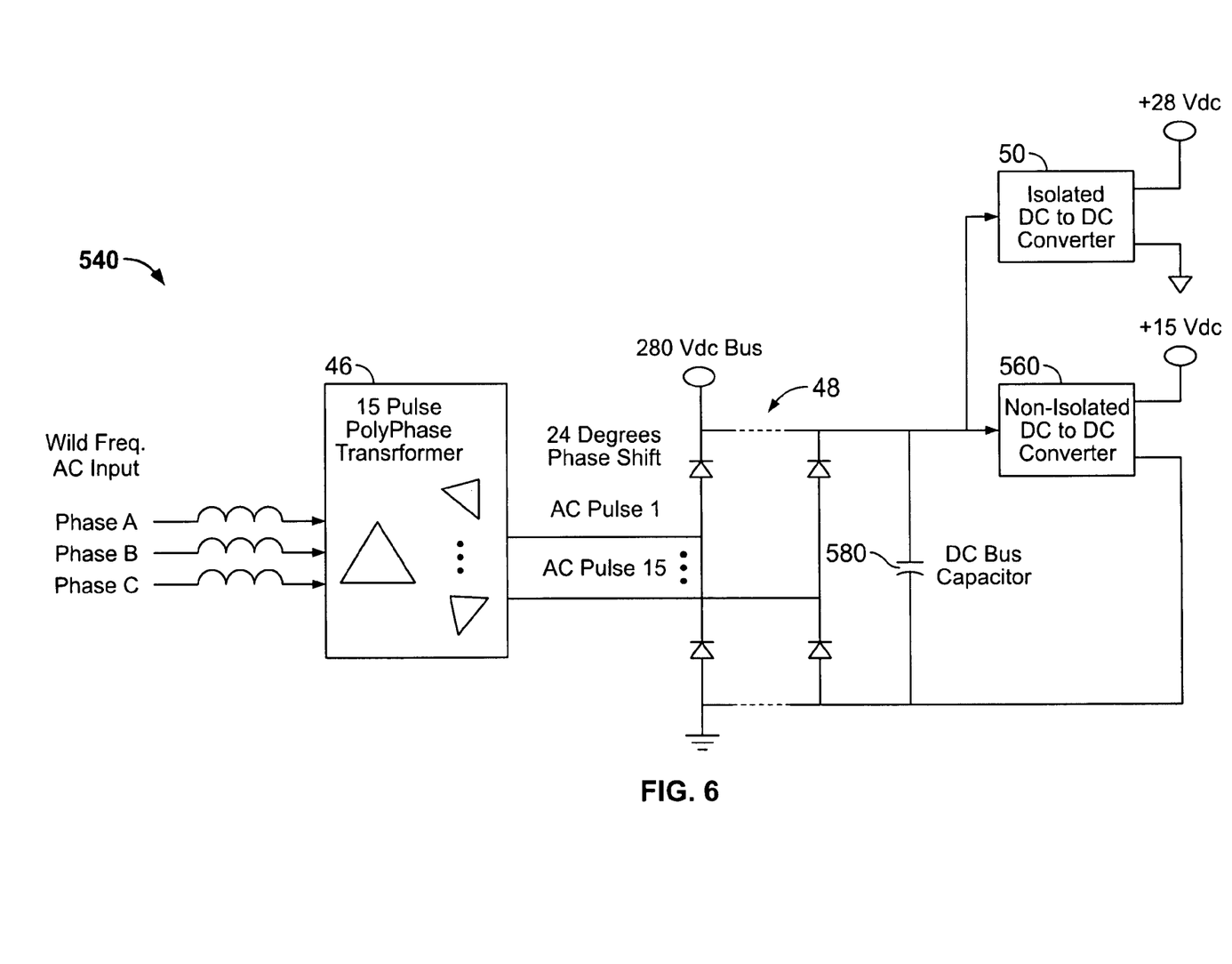
FIG. 6 is a block diagram illustrating an example power module for the refrigeration system of FIG. 1.

Referring now to FIG. 6, the power conversion module 540 is described. As shown in FIG. 6, the power conversion module 540 includes a transformer 46, a rectifier 48, a first DC-DC converter 50 and a second DC-DC converter 560. The transformer 46 is configured as a 15-pulse polyphase transformer and the rectifier 48 is configured as a 15-pulse rectifier such that harmonic distortion/content of the DC current is minimized. The 15-pulse polyphase transformer 46 produces 15 individual phases each shifted by 24 degrees (i.e., 360 degrees divided by 15=24 degrees). The 15-pulse rectifier 48 comprises 15 diode rectifier pairs to convert the input 208 Volt AC to 280 Volt DC according to the following equation:

$$DC\ Voltage = (3 \times Volts\ AC(LL) \times \text{square root } 2)/Pi$$

As previously mentioned, the 280 Volt DC (i.e., bus voltage) is provided to the motor control module 60, specifically the inverter modules, wherein three motor commutation modules 62, 64, 66 (FIG. 1) are configured in parallel to the DC bus. As shown in FIG. 6, a DC bus capacitor 580 is provided across the rectifier 48 to reduce rectifier ripple voltage and supply substantially instantaneous current to the inverters 68, 70, 72 (FIG. 1). The first DC-DC converter 50 is configured as an isolated DC-DC converter that steps down the 280 Volt DC bus voltage to 28 DC Volts. As can be appreciated from FIGS. 1 and 6, the first DC-DC converter 50 provides voltage and operating power to the processing unit 80. Similarly, the second DC-DC converter 560 is configured as a non-isolated DC-DC converter that steps down the 280 Volt DC bus voltage to 15 DC Volts. As can be appreciated from FIGS. 1 and 6, the second DC-DC converter 560 provides voltage and operating power to the commutation modules 62, 64 and 66.

Figure 7:
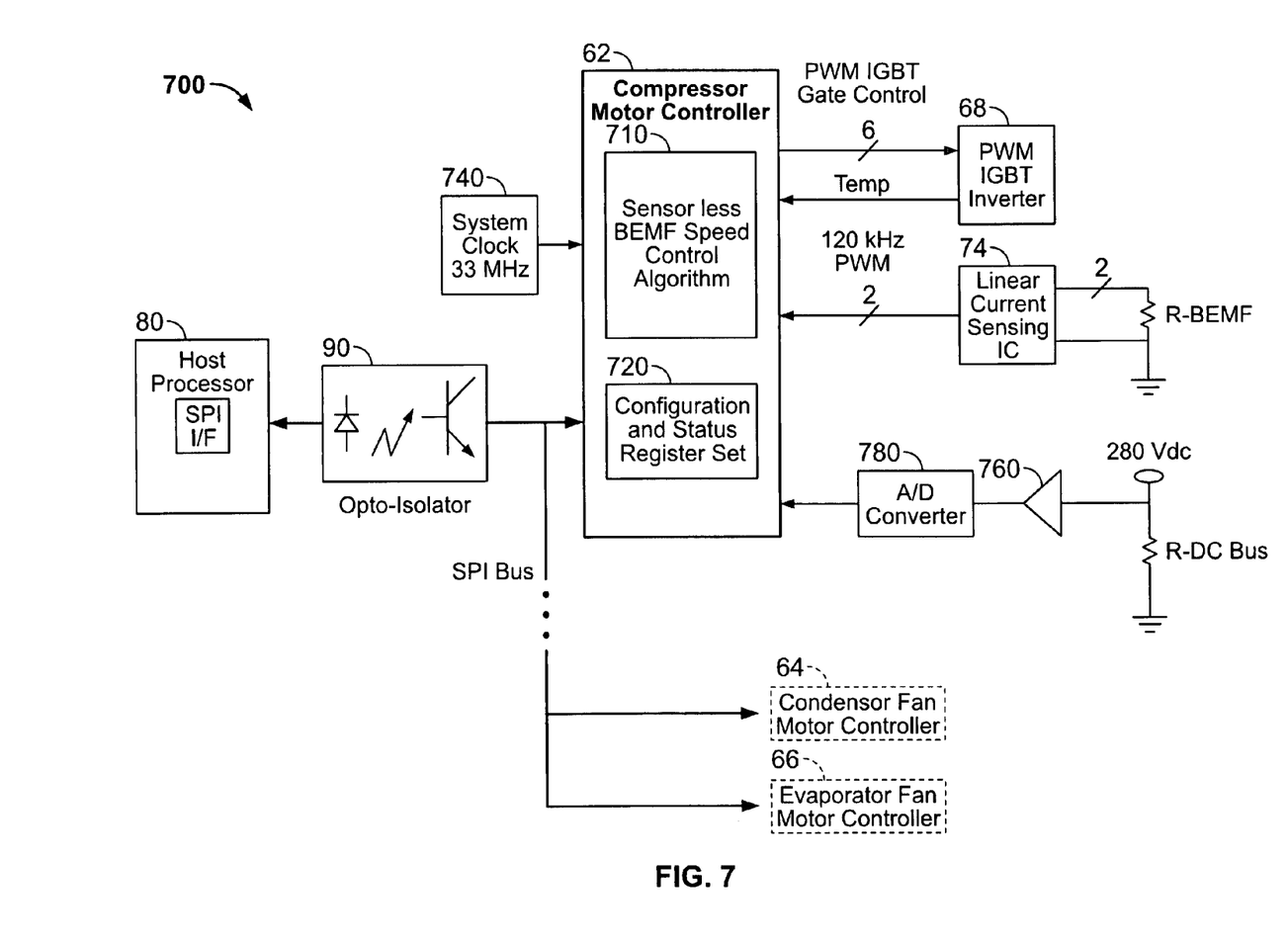
FIG. 7 is a block diagram illustrating an example motor control module for the refrigeration system of FIG. 1.
Figure 8:
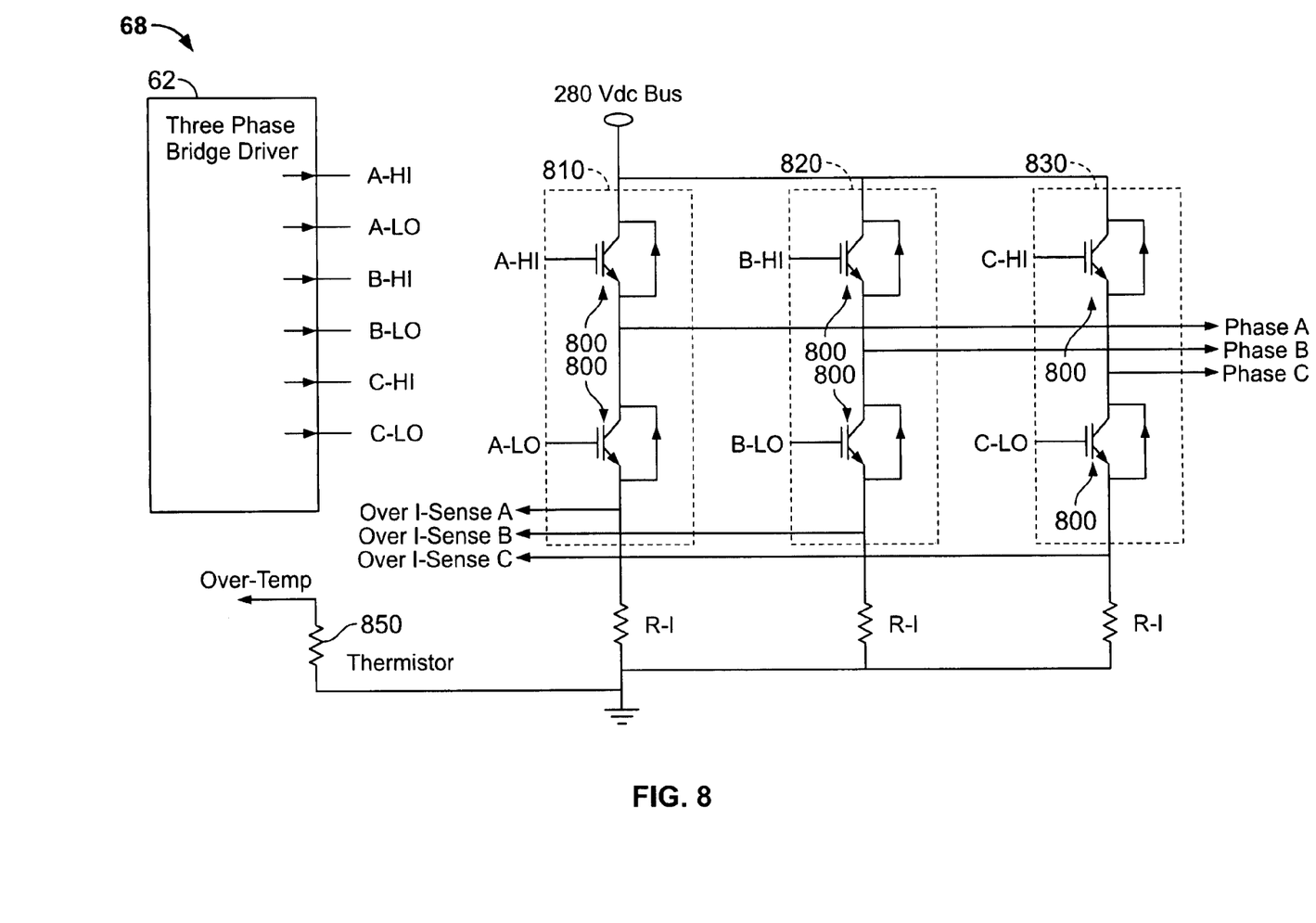
FIG. 8 is a schematic illustrating an example inverter module for the motor control module of FIG. 7.

Referring now to FIGS. 7 and 8, the motor control module 60 is described. As shown in FIG. 7, the motor control module 60 is configured to independently drive the three motors of the refrigeration LRU 100, however, the control module 60 may be employed to control fewer or additional motors in other contexts and applications. Furthermore, the motor control module 60 provides sensor-less sinusoidal-driven variable speed BLDC motor control for the compressor motor and two fans motors of the refrigeration LRU 100. As shown, the motor control module 60 includes the compressor motor controller 700 comprising commutation module 62, a condenser motor controller comprising motor commutation module 64 and an evaporator motor controller comprising commutation module 66. For sake of brevity the motor control module 60 is described hereinafter with respect to the compressor motor controller 700 including commutation module 62, since, as can be appreciated from FIG. 1, the compressor, condenser and evaporator motor controllers are substantially similar.

As shown in FIG. 7, the compressor motor controller 700 includes commutation module 62, clock 740, inverter 68, current sensor 74, amplifier 760 and A/D converter 780. The compressor commutation module 62 may be a digital integrated circuit (IC) chip (e.g., the IRMCK203 available from International Rectifier of El Segundo, Calif.), which is configurable for controlling various types of motors. As further shown, the commutation module 62 includes a motor speed control algorithm 710 and a set of registers 720. The motor speed control algorithm 710 determines motor rotor position/speed using the BEMF value of two of the three motor phases thereby obviating the need for resolvers, encoders, Hall Effect sensors or the like in the motor housing. The sensorless algorithm 710 eliminates problems such as noise and invalid readings due to harness crosstalk and EMI that may arise when using electromechanical-type motor sensors.

To provide closed-loop speed control of the BLDC motors, the position of the rotor of each BLDC motor is determined by a BEMF sensor module relative to the BEMF voltage across a current sense resistor (R-BEMF) having a predetermined, accurate resistance value. Two resistors are provided to detect BEMF for at least two phases of the three motor leg phases. The motor BEMF is sampled at a predetermined rate, for example 133 MHz. The BEMF voltage drops across these resistors are mapped into a range of ±250 mV which is input to a linear current sensing IC 74. This linear current sensing IC 74 converts the analog voltage to a 130 kHz PWM signal which is compatible with the motor commutation module 62. The algorithm 710 in cooperation with the current sensor 74 and processing unit 80 generates sinusoidal motor speed control which optimizes motor power factor and efficiency. In this way, the BLDC motors of LRU 100 are operated with a power factor of greater than about 0.9 thereby making the system more efficient than conventional systems employing induction motors and bang-bang control algorithms.

The commutation module 62 is in communication with a serial peripheral interface (SPI I/F) (474, FIG. 4) of the processing unit 80 for controlling the BLDC compressor motor (FIG. 1). As can be appreciated, the processing unit 80 outputs or otherwise communicates motor control (e.g., PWM) signals to the commutation module 62 to turn on, turn off, reverse direction and vary the speed of the BLDC compressor motor. As shown, the processing unit 80 may interface with the commutation module 62 via an opto-isolator 90, however, other interfacing devices known in the art may alternatively be used. The clock 740 may be a crystal oscillator, monostable multivibrator or other device known in the art for providing a suitable timing/clock signal to the commutation module 62.

Referring now to FIG. 8 the inverter 68 is described in further detail. As shown in FIG. 8, the inverter 68 comprises a plurality of switching elements 800. Although six switching elements 800 are shown, fewer or additional elements 800 may be provided. Although each switching element 800 of the plurality is illustrated as being an insulated gate bipolar transistor (IGBT), the switching elements 800 may alternatively be metal oxide semiconductor field effect transistors (MOSFETs), bipolar junction transistors (BJTs) or other suitable devices known in the art. As shown, each of the switching elements 800 may include a bootstrap diode. The six switching elements 800 are configured in three groups 810, 820, 830, wherein each group includes two switching elements 800 (i.e., a high-side switching element and a low-side switching element) that are interconnected as a half-bridge assembly. Each switching element 800 of the plurality is driven by a signal that is output from the commutation module 62. As should be appreciated, each of the three groups 810, 820, 830 corresponds with one of the three phases (i.e., phases A, B and C, respectively) for controlling commutation or otherwise driving a BLDC motor in the refrigeration LRU 100 (FIG. 1). An output node is configured between the two switching elements 800 of each group 810, 820, 830 and the output node is connected with a phase of the BLDC motor.

As shown, the group 810 (i.e., gates of the A-phase IGBT half-bridge assembly) is driven by signals "A-HI" and "A-LO" for providing a PWM output signal to the A phase motor winding. Similarly, the group 820 (i.e., gates of the B-phase IGBT half-bridge assembly) is driven by signals "B-HI" and "B-LO" for providing a PWM output signal to the B phase motor winding, and the group 830 (i.e., gates of the C-phase IGBT half-bridge assembly) is driven by signals "C-HI" and "C-LO" for providing a PWM output signal to the C phase motor winding. In this way, the inverter 68 is configured to drive the wye-configured three phase windings of the BLDC motor with a sinusoidal current, which is a more optimal and efficient driving waveform in comparison to a conventional, trapezoidal current waveform. The inverter 68 drives the three phases of the motor with a 280 Volt DC PWM signal and an approximately 300 Hz sinusoidal current waveform, which is dependent on the motor RPM.

Additionally as shown in FIG. 8, the inverter 68 includes a temperature sensor 850 (e.g., a thermistor as shown) that is configured to protect or otherwise prevent the inverter 68 against overheating. The temperature sensor 850 may provide an input signal to the processing unit 80, which may process the signal and determine if the inverter 68 is overheating. Thereafter, the processing unit 80 may output control signals to, for example, temporarily and/or partially de-energize the inverter 68 or actuate a heat-dissipation module (not shown) such as a fan, active heat sink or the like. Additionally, the processing unit 80 may output an informational or warning signal to alert an individual of a need for repair, maintenance or the like. Furthermore, each IGBT half-bridge assembly (i.e., groups 810, 820, 830) includes a resistor (R-I) having a predetermined, accurate resistance value for detecting an overcurrent condition in the inverter 68. Furthermore, referring back to FIG. 7, the controller 700 may include a voltage-sense resistor (R-DC bus) connected to an amplifier 760 and an A/D converter 780 for monitoring the DC bus voltage and detecting any DC bus voltage transients.

Operation of the Refrigeration System and Controller

During operation of the refrigeration system 10 and LRU 100, a user determines or otherwise sets a desired temperature of the insulated cavity 130 by selecting one of seven predetermined operating modes shown in Table 1. During a "rapid pulldown mode" for fast chilling of beverages such as soft drinks and wine, it is desired to move the air through the insulated cavity 130 rapidly and also to distribute the cold air equally around each container. As can be appreciated, the present refrigeration system 10 is operative to improve air-flow distribution in the LRU 100 for temperature equalization purposes by the controller 20 independently controlling the speed and direction (e.g., momentary reversing of rotation) of one or more of the BLDC motors (e.g., the BLDC motor of evaporator unit 230). This ensures, for example, that the top of items in the cavity 130 will experience the same temperature as the bottom of the containers during the cooling process. This reversible fan motor direction mixes the air within the insulated cavity 130 allowing for more uniform and efficient distribution of cold air.

Furthermore, in the present refrigeration system 10, by reversing the rotational direction of one or more of the motors in the LRU 100, warm air may enter the evaporator unit 230 for a duration of time, thereby enabling a defrost cycle without the need of a standard (i.e., heating) defrost cycle. Additionally, if a standard (i.e., heating) defrost cycle is needed, reversing the fan motor of evaporator unit 230 will result in a shorter duration defrost time with less power consumption.

TABLE 1

| Operating Mode | Temperature set-point |
|---|---|
| Beverage Chiller | 16° C. (61° F.) |
| Beverage Chiller | 12° C. (54° F.) |
| Beverage Chiller | 9° C. (48° F.) |
| Refrigerator | 7° C. (45° F.) |
| Refrigerator | 4° C. (39° F.) |
| Freezer | −12° C. (10° F.) |
| Freezer | −18° C. (0° F.) |

The controller 20 attempts to maintain the temperature within the insulated cavity 130 within about +/−2° C. of the selected temperature set point by employing closed-loop feedback control to independently control variable motor speeds of the evaporator unit 230, condenser unit 220 and compressor unit 210. If the controller 20 is unable to control the vapor cycle system 200 to maintain the temperature within the insulated cavity 130 within about +/−2° C. of the selected temperature set point, the controller 20 may activate or otherwise provide a warning or alert. For example, the controller 20 may activate the one or more indicators 156 (FIG. 2), which may be embodied as one or more colored lights, according to Table 2.

TABLE 2

| Temp Warning | Time | Threshold | Temperature |
| --- | --- | --- | --- |
| Long Term Warning | 60 mins | 75% | Greater than 4° C. (7.2° F.) above target temperature |
| Short Term Warning | 15 mins | 75% | Greater than 15° C. (27° F.) above target temperature |
| Temp Warning Off | 15 mins | 75% | Actual temperature at or below target temperature |

Compressor Unit Control

The controller 20 monitors return air temperature using return air temperature sensor 310 and adjusts the motor speed of the compressor unit 210 using a PID equation. The motor of the compressor unit 210 is driven by controller 20 so that the compressor motor has a minimum speed of 40%. If the return air temperature sensor 310 has malfunctioned, then data from the supply air temperature sensor 320 may be used by the controller 20 to adjust the air temperature to correspond with selected temperature set-point. In the following tables, 100% compressor motor speed may be, for example, 3500 RPM.

The PID temperature control equation may be overridden if the discharge pressure measured by discharge pressure sensor 370 (FIG. 3) is above a predetermined pressure threshold, for example, 275 psi. In this instance, speed of the motor of compressor unit 210 may be reduced proportionately according to the sensed discharge pressure amount above the threshold discharge pressure. In order to reduce instances of high inrush current, the motor of compressor unit 210 may be started either with no delay, or started after a one-second delay. For example, the delay time shall be determined pseudo-randomly by the processing unit 80 using the least significant bit of the ambient air temperature sensed by inlet air temperature sensor 330. The motor of compressor unit 210 may have a minimum 30 seconds between starts. In a freezer or pulldown mode, the hot gas bypass valve 260 (FIG. 3) may be opened approximately 5 seconds before each start of the compressor unit motor. Furthermore, in a freezer or pulldown mode, the hot gas bypass valve 260 may be closed approximately 5 seconds after each start of the compressor unit motor. After the compressor start logic, the hot gas valve 260 may be closed if the temperature sensed in the insulated cavity 130 (FIG. 2) is more than about 5° F. above the set-point temperature. The hot gas valve 260 may be open if the temperature sensed in the insulated cavity 130 is more than about 3° F. below the set-point temperature, except in freezer and pulldown modes, in which case the hot gas valve 260 may be closed. Moreover, the liquid line valve 280, in chiller mode only, may be closed if the temperature sensed in the insulated cavity 130 is more than about 7° F. below the set-point temperature, and shall be opened if the temperature is more than about 3° F. above the set-point temperature.

Evaporator Unit Control

The speed of the motor of the evaporator unit 230 may be controlled by controller 20 according to Table 3. In this table, 100% evaporator speed may be, for example, 8500 RPM. The motor of evaporator unit 230 may have a minimum 5 seconds between starts.

TABLE 3

| Set Point/Mode | Evaporator Fan Speed |
| --- | --- |
| Compressor Off | Off |
| Defrost Mode | Off |
| Door Not Locked for < 10 minutes | 40% |
| Door Not Locked for >= 10 minutes | Resume control of fan |
| Rapid Pulldown | 100% |
| Freezer Temperature Control Mode | |
| (Return Air temp − Set point) > 5.6° C. (10° F.) | 100% |
| 4.4° C. (10° F.) >= (Return Air temp − Set point) >= 4.4° C. (8° F.) | unchanged |
| (Return Air temp − Set point) < 4.4° C. (8° F.) | 60% |
| Refrigerator/Chiller Temperature Control Mode | |
| (Return Air Temp − Supply Air Temp) > 3.3° C. (6° F.) | 100% |
| 3.3° C. (6° F.) >= (Return Air temp − Supply Air Temp) >= 2.2° C. (4° F.) | unchanged |
| (Return Air Temp − Supply Air Temp) < 2.2° C. (4° F.) | 60% |
| Default if either supply or return air temperature sensor is malfunctioning | 70% |

Condenser Unit Control

The speed of the motor of condenser unit 220 may be controlled by the controller 20 according to Table 4. In this table, 100% condenser motor speed may be, for example, 8500 RPM. The motor of condenser unit 220 may remain on for 2 minutes after the motor of compressor unit 210 has stopped.

TABLE 4

| Ambient Temperature | Condenser Fan Speed |
| --- | --- |
| Above 119° F. (Above 48.3° C.) | 100% |
| 115° F. to 119° F. (46.1° C. to 48.3° C.) | Unchanged |
| 85° F. to 114° F. (29.4° C. to 45.6° C.) | 90% |
| 80° F. to 84° F. (26.7° C. to 28.9° C.) | Unchanged |
| 50° F. to 79° F. (10° C. to 26.1° C.) | 80% |
| 45° F. to 49° F. (7.2° C. to 94° C.) | Unchanged |
| Below 45° F. (Below 7.2° C.) | 70% |

TABLE 4-continued

| Ambient Temperature | Condenser Fan Speed |
|---|---|
| Default if ambient temperature sensor has malfunctioned | 90% |

History Data Logging

In some embodiments of the system 10 the controller 20 may write sensor data and other inputs to a history log data structure for retrieval and use in diagnosing faults, malfunction, human error, etc. relative to the operation of the refrigeration LRU 100. An example history log data structure may include a header that is written by the controller 20 at each initialization/power-on of the refrigeration LRU 100. As shown in Table 5, the header may provide general identification of hardware and software versions, lifetime status of the refrigeration LRU 100, etc.

TABLE 5

| Element Name | Description |
|---|---|
| Entry Type | Identifies the data as a header entry or a type of log entry: Warning, Fault, or Information |
| Part Number | Binary Part Number (e.g. 0x0600) |
| Dash Number | Binary dash number. |
| Build Number | Build number for the project |
| App Rev Letter | ASCII revision letter for application code |
| Boot Rev Letter | ASCII revision letter for boot code |
| Modification Month | Modification month (binary) |
| Modification Day | Modification day (binary) |
| Modification Year | Modification year (binary) |
| CAN Address | Controller address for network communication |
| Current Index | The index for the next history log entry |
| Auto Start | Stores the status for autostart on power up |
| Number of Starts | Number of Starts |
| Hours Run | Lifetime number of hours powered on |
| Compressor Hours | Lifetime number of hours the compressor has run |
| Evaporator Fan Hours | Lifetime number of hours the evaporator fan has run |
| Condenser Fan Hours | Lifetime number of hours the condenser fan has run |
| Number of Defrosts | Lifetime number of defrosts |
| Number of Failures | Lifetime number of failures |

Furthermore, as shown in Table 6, each data entry includes data from the plurality of sensors of the vapor cycle system 200. Thus, each data entry that is written by the controller 20 to the history log data structure includes information indicative of instantaneous operation of the refrigeration LRU 100 to help discriminate between real problems (e.g., faults, hardware failure, etc.) or user-error induced problems.

TABLE 6

| Element Name | Description |
|---|---|
| Entry Type | Identifies the data as a header entry or a type of log entry: Warning, Fault, or Information |
| Date Time | Time Since Power On |
| Start Number | Start number used to group entries together |
| Mode | Current mode of operation |
| Set Point | Current temperature selection |
| Supply Temp | Supply air temp |
| Return Temp | Return air temp |
| Inlet Air Temp | Condenser air temperature at the inlet |
| Exhaust Air Temp | Condenser air temperature at the outlet |
| Evaporator Fan Stator Temp | Temperature of the evaporator fan |
| Condenser Fan Stator Temp | Temperature of the condenser fan |
| Compressor Stator Temp | Temperature of the compressor |
| Discharge Pressure | Discharge pressure in psig |
| Suction Temperature | Temperature of the refrigerant |
| PC Board Temperature | Temperature of the PC Board |
| Input Discretes | Door Switch |
| | High Pressure Cutout Switch |
| | Hot Gas Bypass Valve current present |
| | Liquid Line Valve current present |
| | Power Monitor Phases A, B, and C |
| Output Discretes | Hot Gas Bypass Valve |
| | Liquid Line Solenoid Valve |
| | On LED |
| | Temp Warning LED |
| | Fault LED |
| Evaporator Fan speed | The speed of the evaporator fan |
| Condenser Fan speed | The speed of the condenser fan |
| Compressor Fan speed | The speed of the compressor |
| Information Code | Active information or error code |

In some embodiments, the controller 20 may be operative to dynamically vary its data logging between at least two logging modes. That is, the frequency, interval or rate at which the controller 20 writes data entries to the history log data structure may change to suitably capture operating data and parameters of the refrigeration LRU 100 for the purposes of, for example, debugging and diagnosing irregular operation. In one example, data entries may be written by the controller 20 to the data structure: 1) in a normal data-logging mode every 3 minutes during normal operation; 2) in a standby data-logging mode every 15 minutes while not performing cooling operations (including after shutdown); 3) in a warning data-logging mode every 1 minute while a warning event is detected; 4) in an informational data-logging mode for logging an informational event substantially simultaneously with its occurrence; and 5) in a fault data-logging mode for logging a fault event substantially simultaneously with its occurrence. Furthermore, the controller 20, in some embodiments, may implement a rollover algorithm in which the oldest data entries are overwritten by new data entries using a "circular" list of entries. Determination of occurrences of the events (i.e., warning events, fault events and informational events) is performed by the controller 20 relative to the plurality of received inputs (i.e., sensor data inputs and user inputs).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A wild frequency avionic galley refrigeration system chiller unit comprising:
a housing including a cavity configured to store comestible items, and a door coupled with the housing, the door being movable between a closed orientation for sealing the cavity and an open orientation for accessing or disposing comestible items in the cavity;
a vapor cycle system disposed in the housing for chilling comestible items in the cavity, the vapor cycle system including a brushless DC compressor motor, a brushless DC condenser motor, a brushless DC evaporator motor and a plurality of sensors configured to output operating parameter data relative to the cavity and the vapor cycle system;
a power module disposed in the housing, the power module configured to convert a wild frequency AC input voltage to at least one DC output voltage;
a motor control module disposed in the housing, the motor control module being in communication with the brushless DC compressor motor, the brushless DC condenser motor and the brushless DC evaporator motor; and
a processing module disposed le being in communication with the plurality of sensors and the motor control module, wherein the processing module, according to the operating parameter data, outputs control signals to the motor control module for independently driving the brushless DC compressor motor, the brushless DC condenser motor and the brushless DC evaporator motor.

2. The system wild frequency avionic galley chiller unit of claim 1 wherein the power module comprises:
a three phase 15-pulse transformer; and
a 15-pulse rectifier.

3. The wild frequency avionic galley chiller unit of claim 2 wherein the power module further comprises a power protection module including:
a voltage sensor module configured to detect at least one of an interruption of the wild frequency AC input voltage, an over-voltage transient of the wild frequency AC input voltage, and an under-voltage of the DC output voltage;
at least one switch in communication with the voltage sensor module, the at least one switch configured to interrupt the wild frequency AC input voltage and the DC output voltage.

4. The wild frequency avionic galley chiller unit of claim 3 wherein the at least one switch comprises:
a three phase, normally closed AC relay interposed between the three phase 15-pulse transformer and a wild frequency AC source; and
a MOSFET interposed between the 15-pulse rectifier and the motor control module.

5. The wild frequency avionic galley chiller unit of claim 1 wherein the motor control module comprises:
a back EMF sensor module configured to output a rotor position signal for at least one of the brushless DC compressor motor, the brushless DC condenser motor and the brushless DC evaporator motor;
a commutation module in communication with the back EMF sensor module and the processing module, the commutation module configured to output a PWM signal according to the control signals from the processing module and the rotor position signal; and
a three phase inverter module in communication with the commutation module, the three phase inverter module configured to drive, according to the PWM signal, at least one of the brushless DC compressor motor, the brushless DC condenser motor and the brushless DC evaporator motor.

6. The system wild frequency avionic galley chiller unit of claim 5 wherein the three phase inverter module comprises:
a first switching assembly for driving a first phase of at least one of the brushless DC compressor motor, the brushless DC condenser motor and the brushless DC evaporator motor;
a second switching assembly for driving a second phase of at least one of the brushless DC compressor motor, the brushless DC condenser motor and the brushless DC evaporator motor; and
a third switching assembly for driving a third phase of at least one of the brushless DC compressor motor, the brushless DC condenser motor and the brushless DC evaporator motor.

7. The wild frequency avionic galley chiller unit of claim 6 wherein each of the first, second and third switching assemblies comprises an IGBT half-bridge.

8. The wild frequency avionic galley chiller unit of claim 5 wherein the motor control module further comprises a temperature sensing module configured to prevent overheating of the motor control module.

9. The wild frequency avionic galley chiller unit of claim 8 wherein the temperature sensing module comprises a thermistor in communication with the commutation module.

10. A controller for a wild frequency avionic galley chiller unit including a housing with a cavity configured to store comestible items, a vapor cycle system for chilling comestible items in the cavity, the vapor cycle system having a brushless DC compressor motor, a brushless DC condenser motor, a brushless DC evaporator motor and a plurality of sensors configured to output operating parameter data relative to the vapor cycle system, the controller comprising:
a power module disposed in the housing, the power module being configured to convert a wild frequency AC input voltage to at least one DC output voltage;
a motor control module disposed in the housing the motor control module being in communication with the brushless DC compressor motor, the brushless DC condenser motor and the brushless DC evaporator motor; and
a processing module disposed in the housing, the processing module being in communication with the plurality of sensors and the motor control module, wherein the processing module, according to the operating parameter data, outputs control signals to the motor control module for independently driving the brushless DC compressor motor, the brushless DC condenser motor and the brushless DC evaporator motor.

11. The controller of claim 10 wherein the power module comprises:
a three phase 15-pulse transformer; and
a 15-pulse rectifier.

12. The controller of claim 11 wherein the power module further comprises a power protection module including:
a voltage sensor module configured to detect at least one of an interruption of the wild frequency AC input voltage, an over-voltage transient of the wild frequency AC input voltage, and an under-voltage of the DC output voltage;

at least one switch in communication with the voltage sensor module, the at least one switch configured to interrupt the wild frequency AC input voltage and the DC output voltage.

13. The controller of claim 12 wherein the at least one switch comprises:
a three phase, normally closed AC relay interposed between the three phase 15-pulse transformer and a wild frequency AC source; and
a MOSFET interposed between the 15-pulse rectifier and the motor control module.

14. The controller of claim 10 wherein the motor control module comprises:
a back EMF sensor module configured to output a rotor position signal for at least one of the brushless DC compressor motor, the brushless DC condenser motor and the brushless DC evaporator motor;
a commutation module in communication with the back EMF sensor module and the processing module, the commutation module configured to output a PWM signal according to the control signals from the processing module and the rotor position signal; and
a three phase inverter module in communication with the commutation module, the three phase inverter module configured to drive, according to the PWM signal, at least one of the brushless DC compressor motor, the brushless DC condenser motor and the brushless DC evaporator motor.

15. The controller of claim 14 wherein the three phase inverter module comprises:
a first switching assembly for driving a first phase of at least one of the brushless DC compressor motor, the brushless DC condenser motor and the brushless DC evaporator motor;
a second switching assembly for driving a second phase of at least one of the brushless DC compressor motor, the brushless DC condenser motor and the brushless DC evaporator motor; and
a third switching assembly for driving a third phase of at least one of the brushless DC compressor motor, the brushless DC condenser motor and the brushless DC evaporator motor.

16. The controller of claim 15 wherein each of the first, second and third switching assemblies comprises an IGBT half-bridge.

17. The controller of claim 14 wherein the motor control module further comprises a temperature sensing module configured to prevent overheating of the motor control module.

18. The controller of claim 17 wherein the temperature sensing module comprises a thermistor in communication with the commutation module.

* * * * *